United States Patent
Yoneyama et al.

(10) Patent No.: US 7,191,806 B2
(45) Date of Patent: Mar. 20, 2007

(54) OIL INJECTING APPARATUS

(75) Inventors: Ryoji Yoneyama, Chiba (JP); Shinji Kinoshita, Chiba (JP); Toru Kumagai, Chiba (JP); Hiromitsu Gotoh, Chiba (JP); Atsushi Ohta, Chiba (JP)

(73) Assignee: Seiko Instruments Inc. (JP)

( * ) Notice: Subject to any disclaimer, the term of this patent is extended or adjusted under 35 U.S.C. 154(b) by 103 days.

(21) Appl. No.: 10/525,465

(22) PCT Filed: Mar. 11, 2004

(86) PCT No.: PCT/JP2004/003192

§ 371 (c)(1),
(2), (4) Date: Apr. 18, 2005

(87) PCT Pub. No.: WO2004/081439

PCT Pub. Date: Sep. 23, 2004

(65) Prior Publication Data

US 2005/0173196 A1 Aug. 11, 2005

(30) Foreign Application Priority Data

Mar. 14, 2003 (JP) .............................. 2003-069770

(51) Int. Cl.
*B65B 31/04* (2006.01)
(52) U.S. Cl. .............................. 141/65; 141/51; 141/59; 141/67; 184/55.1
(58) Field of Classification Search ................ 141/4–8, 141/51, 57, 59, 65, 67, 286; 277/345, 400, 277/401; 384/100, 107, 114; 184/29, 55.1, 184/55.2, 57, 6.22, 58
See application file for complete search history.

(56) References Cited

U.S. PATENT DOCUMENTS

| | | | | |
|---|---|---|---|---|
| 5,112,142 A | * | 5/1992 | Titcomb et al. | 384/107 |
| 5,601,125 A | * | 2/1997 | Parsoneault et al. | 141/51 |
| 5,862,841 A | * | 1/1999 | Wuester, Sr. | 141/284 |
| 7,028,721 B2 | * | 4/2006 | Bowdoin et al. | 141/59 |

FOREIGN PATENT DOCUMENTS

JP 2004278630 A * 10/2004
JP 2004278760 A * 10/2004

* cited by examiner

*Primary Examiner*—Timothy L. Maust
(74) *Attorney, Agent, or Firm*—Adams & Wilks

(57) ABSTRACT

The opening of an oil container 11 for storing oil 12 is sealed airtight with a cover member 32. A one-sided-bag-shaped fluid dynamic pressure bearing 10 is seated on an O-ring 25 and fixed airtight onto the upper surface of a bearing seating 30. Inanexhaust position with the distal end portion of an injection tube 36 positioned away from an oil level, the inside of the oil container 11 is evacuated by a vacuum pump 22 through a suction/exhaust passage including a suction/exhaust through-hole 17, thus turning the inside of the one-sided-bag-shaped fluid dynamic pressure bearing (10) into a vacuum. In this state, a control device drives a moving device to raise the oil container 11 to an injection position and releases the suction/exhaust passage to the atmosphere. This causes the oil 12 to be injected into the one-sided-bag-shaped fluid dynamic pressure bearing 10 through an oil injection passage including the injection tube 36.

9 Claims, 7 Drawing Sheets

US 7,191,806 B2

OIL INJECTING APPARATUS

CROSS REFERENCE TO RELATED APPLICATIONS

The present application is a U.S. national stage application of co-pending International Application No. PCT/JP2004/003192, filed Mar. 11, 2004, claiming a priority date of Mar. 14, 2003, and published in a non-English language.

TECHNICAL FIELD

The present invention relates to an apparatus for injecting oil into a one-sided-bag-shaped fluid dynamic pressure bearing by a vacuum injection method.

The term "one-sided-bag-shaped fluid dynamic pressure bearing" as used herein refers to a fluid dynamic pressure bearing composed of bearing components including a shaft and a sleeve, and oil injected into a minute gap formed between those bearing components, the fluid dynamic pressure bearing having only one oil injection port for oil injection into the minute gap.

BACKGROUND ART

As is well known, rolling bearings have been widely adopted for motors that drive 3.5-inch discs. However, fluid dynamic pressure bearings are increasingly being adopted for small motors that drive smaller discs such as 2.5-inch or 1.0-inch discs instead of rolling bearings.

As shown, for example, in FIG. 6, such a fluid dynamic pressure bearing includes a flanged shaft 1 serving as a rotary bearing member, a stepped closed-end sleeve 4 serving as a stationary bearing member, a thrust retainer plate 5 serving as an annular cover member, and lubricating oil injected into a minute gap formed by those members.

The flanged shaft 1 includes a cylinder portion 2 and an annular flange portion 3 that are integrated with each other. A lower part of the cylinder portion 2 of the flanged shaft 1 serves as a radial dynamic pressure bearing cylinder portion, with radial dynamic pressure generating grooves G1 formed on the outer peripheral surface thereof. Further, an upper part of the cylinder portion 2 of the flanged shaft 1 serves as a rotor-mounting cylinder portion, with a rotor-hub-mounting cylinder portion of a small diameter being formed at its distal end.

The annular flange portion 3 of the flanged shaft 1, which functions as a disc-shaped thrust plate, has thrust dynamic pressure generating grooves formed respectively on its upper and lower surfaces.

The stepped closed-end sleeve 4 has a lower cylinder portion of a small diameter and an upper cylinder portion of a larger diameter. An opening with a still larger diameter is formed at the upper end portion of the upper cylinder portion. The thrust retainer plate 5 is fitted airtight into this opening, whereby the opening of the stepped closed-end sleeve 4 is sealed airtight with the thrust retainer plate 5. Formed at the boundary between the small-diameter lower cylinder portion and the large-diameter upper cylinder portion is an annular step portion serving as the bottom portion of the upper cylinder portion.

Between the flanged shaft 1, the stepped closed-end sleeve 4, and the thrust retainer plate 5, there are formed a cylindrical minute gap R1, an annular minute gap R2, a cylindrical minute gap R3, an annular minute gap R4, a cylindrical minute gap R5, and a disc-shaped minute gap R6. Although somewhat exaggerated in FIG. 6, the sizes of the minute gaps R1 through R6 range from ten to several tens μ in the case of small and thin fluid dynamic pressure bearings used in small and thin motors.

It is to be noted that the minute gaps R3 and R6, each functioning as an oil reservoir, are formed wider than the other minute gaps. Lubricating oil is injected into these minute gaps by a vacuum injection method from the annular opening of the cylindrical minute gap R1.

The inner peripheral surface of the thrust retainer plate 5 forms an outwardly tapered surface. Accordingly, when seen in cross section, the cylindrical minute gap R1 formed between the inner peripheral surface of the thrust retainer plate 5 and the upper outer peripheral surface of the cylinder portion 2 forms a tapered gap that is tapered outwardly from the inner to outer portions of the bearing. The resulting capillary action and surface tension form a capillary seal portion S that functions to prevent the lubricating oil from leaking outside of the bearing. Further, the cylindrical minute gap R3 serves as an oil reservoir for thrust dynamic pressure bearing, and the disc-shaped minute gap R6 serves as an oil reservoir for radial dynamic pressure bearing.

As described above, the one-sided-bag-shaped fluid dynamic pressure bearing shown in FIG. 6 includes the flanged shaft 1, the stepped closed-end sleeve 4, the thrust retainer plate 5 that is an annular cover member, and oil for lubrication injected into a minute gap consisting of the plurality of minute gaps R1 to R6 that are communicated with each other and formed between those components. This minute gap defines a one-sided-bag-shaped minute gap, with the opening of the minute gap R1, which opens to the atmosphere, serving as the only opening of this minute gap.

Although it is not easy to inject oil into such a one-sided-bag-shaped fluid dynamic pressure bearing having a one-sided-bag-shaped minute gap, some injection methods have already been developed to this end, such as the vacuum injection methods disclosed in U.S. Pat. No. 5,601,125 (Patent Document 1), U.S. Pat. No. 5,862,841 (Patent Document 2), and U.S. Pat. No. 5,894,868 (Patent Document 3).

As shown in FIG. 5, for example, a conventional oil injecting apparatus employing a vacuum injection method includes an oil container 11 storing an oil 12 to a predetermined level, a cover member 13 having an oil injection through-passage 15 and a suction/exhaust through-passage 17, a bellows 11a that is secured airtight to the back surface of the cover member 13 at one end and to the opening of the oil container 11 at the other end, an injection tube 14 whose distal end projects straight into the oil container 11 and whose other end is connected to the oil injection through-passage 15, a suction/exhaust tube 16 whose distal end projects straight into the oil container 11 and whose other end is connected to one end of the suction/exhaust through-passage 17 of the cover member 13, a suction/exhaust device connected to the other end of the suction/exhaust through-passage 17 of the cover member 13, a moving device that vertically moves the oil container 11 from an exhaust position (FIG. 5 (A)) with the distal end of the injection tube 14 positioned away from the oil level into an injection position (FIG. 5(B)) with the distal end of the injection tube 14 submerged into the oil, and bearing fixing means for fixing the one-sided-bag-shaped fluid dynamic pressure bearing 10, into which the oil 12 is to be injected, onto the cover member 13 with its surface on the oil injection port side being seated on an O-ring 25.

The suction/exhaust device includes a vacuum pump 22, suction/exhaust tubes 18, 20, 21, and valves 23, 24. The moving device includes a stepping motor 27 and an oil container holder 28. Further, the bearing fixing means forms a part of a holding device (not shown) holding the cover member 13.

Oil injection is performed as follows with such a conventional oil injecting apparatus. First, in the exhaust position (FIG. 5(A)) with the distal end of the injection tube 14 positioned away from the oil level inside the oil container 11, a control device (not shown) opens the valve 23 and closes the valve 24, and activates the vacuum pump 22. As this happens, the inside of the oil container 11 is evacuated through the suction/exhaust tube 16, the suction/exhaust through-hole 17, and the suction/exhaust tubes 18 and 20; at the same time, the inside of the one-sided-bag-shaped fluid dynamic pressure bearing 10, which communicates with the inside of the oil container 11 through the injection tube 14 and the oil injection through-hole 15, is also evacuated into a vacuum.

Then, in this state, the control device drives the moving device to raise the oil container 11, whereby the distal end of the injection tube 14 is submerged into the oil 12. Subsequently, in this injection position (FIG. 5(B)), the control device closes the valve 23 and opens the valve 24. As this happens, the inside of the oil container 11 is communicated with the atmosphere through the suction/exhaust tube 16, the suction/exhaust through-hole 17, and the suction/exhaust tubes 18 and 21, and thus turned into the atmospheric pressure. This causes the oil 12 in the oil container 11 to be injected into the one-sided-bag-shaped fluid dynamic pressure bearing 10.

Incidentally, the conventional oil injection apparatus described above is equipped with an extendable part such as a bellows for vertically moving-the oil container. This bellows is formed of a rubber material and hence liable to deform when placed in a high vacuum. Such deformation of the bellows makes it difficult to maintain a high vacuum degree with good accuracy, resulting in poor durability. This leads to a problem in that the bellows must be exchanged frequently in order to maintain this accuracy. In short, the conventional oil injecting apparatus described above is poor in operability, resulting in an increase in maintenance cost.

An object of the present invention is to provide an oil injecting apparatus for injecting oil into a one-sided-bag-shaped fluid dynamic pressure bearing by a vacuum injection method, the apparatus providing good operability and low maintenance cost.

DISCLOSURE OF THE INVENTION

To attain the above object, in an oil injecting apparatus for injecting oil into a one-sided-bag-shaped fluid dynamic pressure bearing by a vacuum injection method, an injection tube is disposed so as to be movable while passing through a cover of an oil container, with airtightness being retained by an O-ring, and the distance between the oil container and a bearing seating, onto which the one-sided-bag-shaped fluid dynamic pressure bearing to be injected with oil is mounted and fixed airtight, is changed to thereby effect a change from an exhaust position to an injection position.

That is, an oil injecting apparatus for a one-sided-bag-shaped fluid dynamic pressure bearing which is designed to attain the above-mentioned object includes: a bearing seating having a bearing seating surface formed on a front surface thereof and an oil injection through-passage extending through the bearing stand from the front surface to a back surface thereof; an oil container storing oil to a predetermined level and sealed with a cover member provided with an injection tube pass-through hole; a suction/exhaust tube having one end projecting into the oil container and the other end connected to a suction/exhaust device; an injection tube passing through the injection tube pass-through hole of the cover member such that the injection tube is capable of vertical movement while maintaining airtightness, the injection tube having a lower end projecting into the oil container and an upper end secured to a lower end of the oil injection through-passage of the bearing seating; a distance changing device which changes a distance between the bearing seating and the oil container from an exhaust position with the lower end of the injection tube positioned away from an oil level into an injection position with the lower end of the injection tube submerged into oil; and bearing fixing means abutting a one-sided-bag-shaped fluid dynamic pressure bearing into which oil is to be injected, for fixing airtight the one-sided-bag-shaped fluid dynamic pressure bearing onto the bearing seating.

Further, the one-sided-bag-shaped fluid dynamic pressure bearing is fixed onto the cover member by the bearing fixing means, an inside of the one-sided-bag-shaped fluid dynamic pressure bearing is brought into a vacuum in the exhaust position by the suction/exhaust device, and then in the injection position, the suction/exhaust tube is released to the atmosphere to inject oil in the oil container into the one-sided-bag-shaped fluid dynamic pressure bearing.

The change from the exhaust position to the injection position is effected through vertical movement of the bearing seating or the oil container.

The distance changing device is, for example, a stepping motor, a hydraulic motor, an air cylinder, or the like.

BEST MODE FOR CARRYING OUT THE INVENTION

Figure 1:
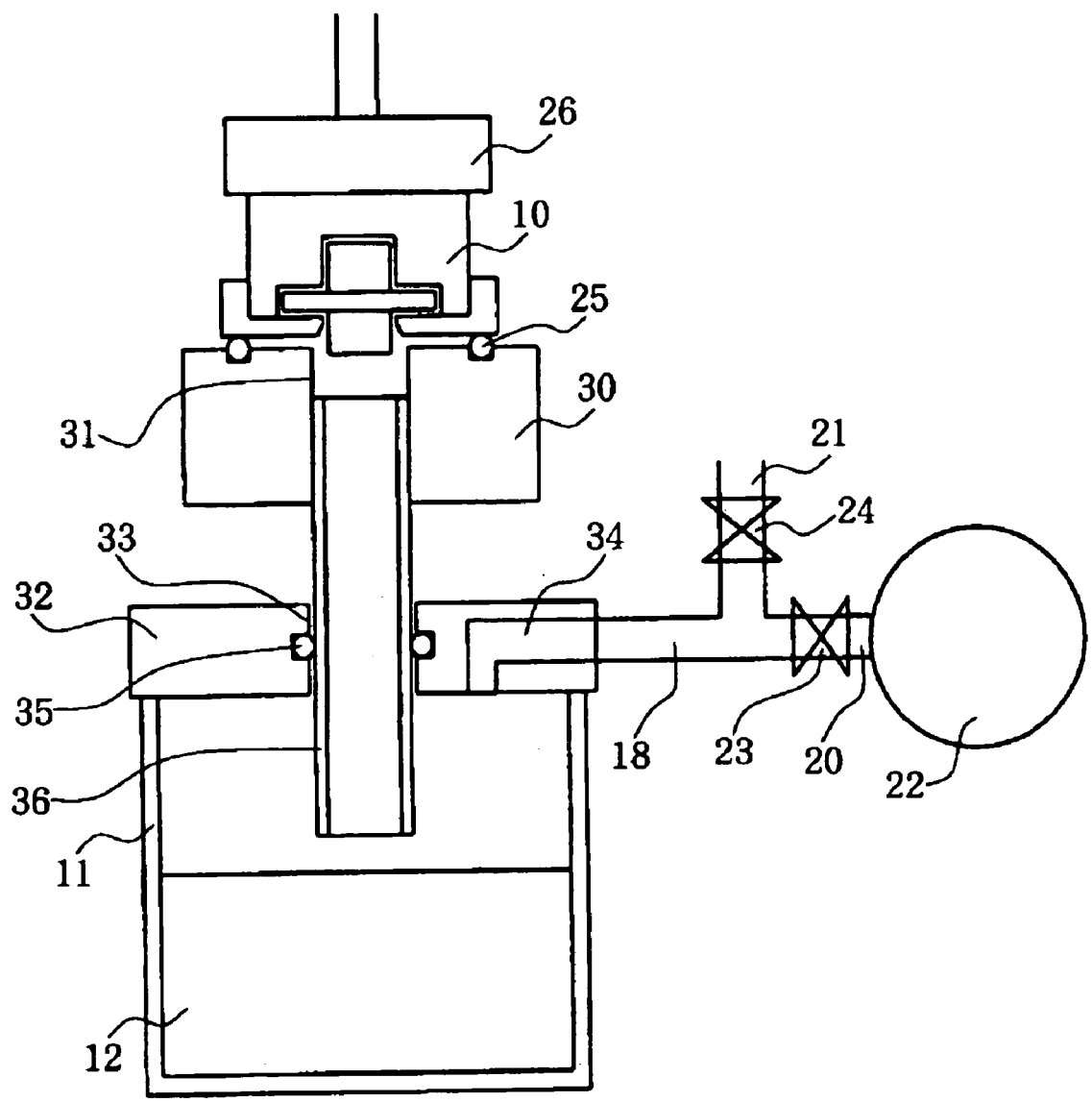
FIG. 1 is a sectional view schematically showing an oil injecting apparatus for a one-sided-bag-shaped fluid dynamic pressure bearing according to a first embodiment of the present invention in an exhaust position.
Figure 2:
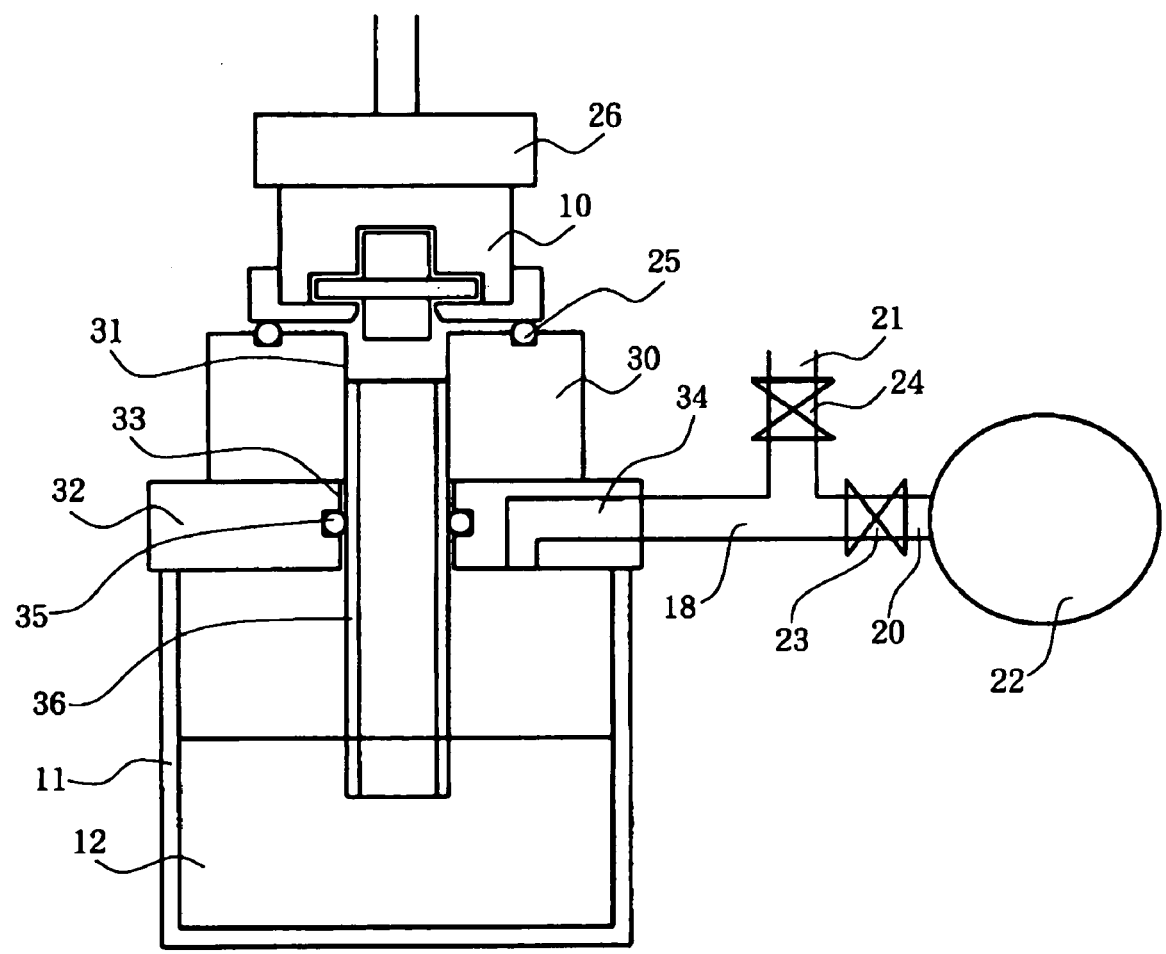
FIG. 2 is a sectional view schematically showing the oil injecting apparatus for the one-sided-bag-shaped fluid dynamic pressure bearing according to the first embodiment of the present invention in an injection position.
Figure 4A:
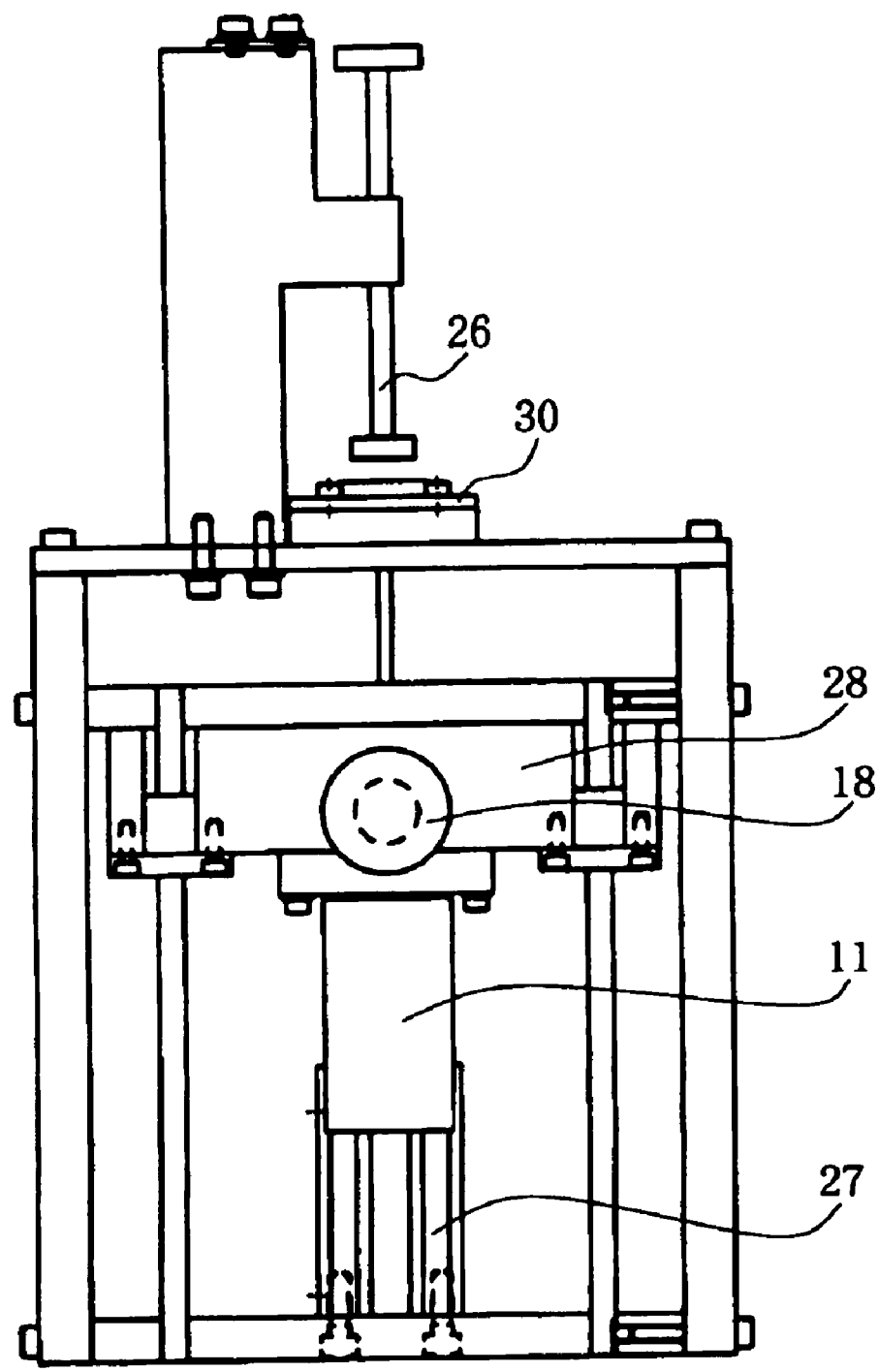
FIG. 4 are a front view (A) and a side view (B) of the oil injecting apparatus for a one-sided-bag-shaped fluid dynamic pressure bearing according to the first embodiment of the present invention.
Figure 4B:
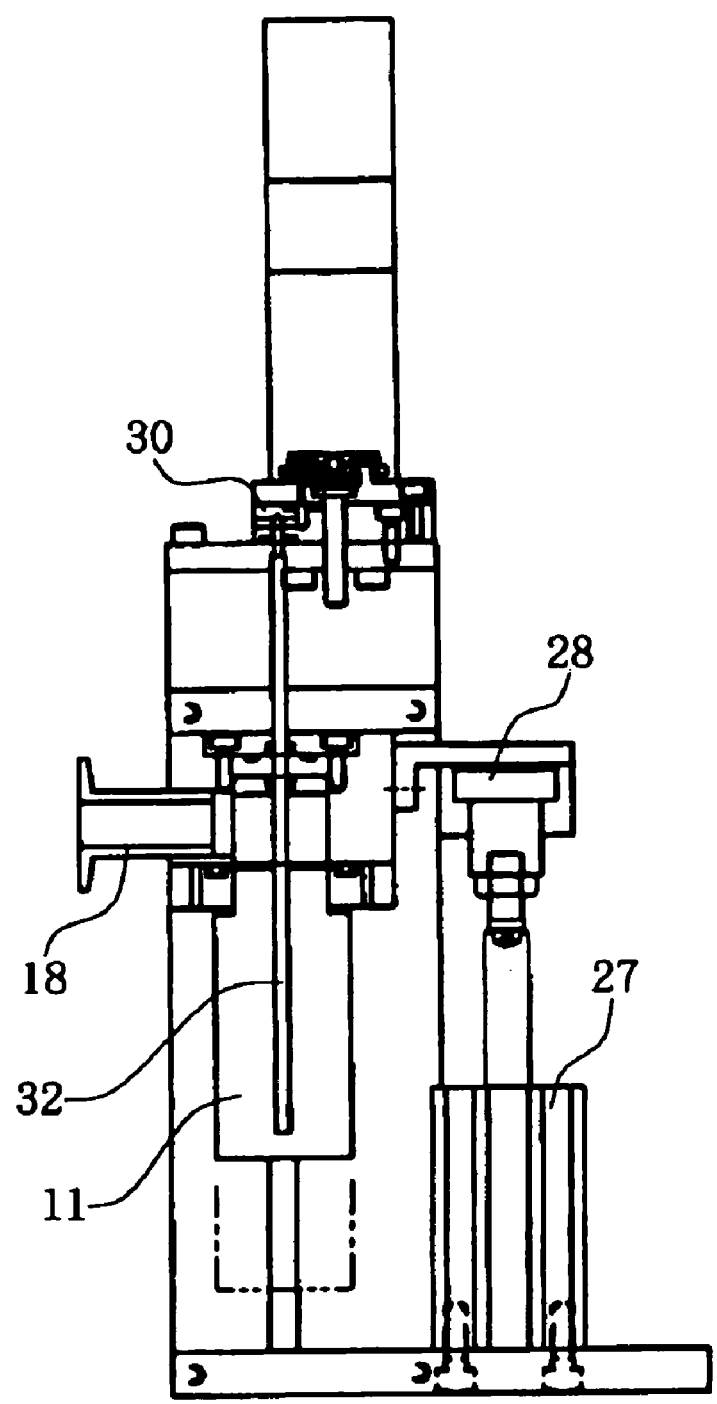
Figure 5A:
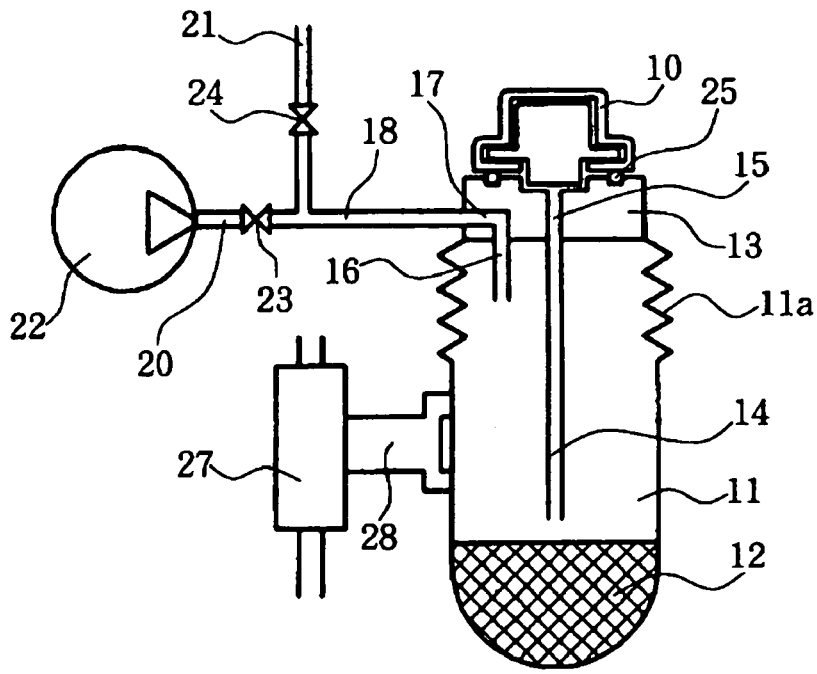
FIG. 5 is a sectional view schematically showing a conventional oil injecting apparatus for a one-sided-bag-shaped fluid dynamic pressure bearing.
Figure 5B:
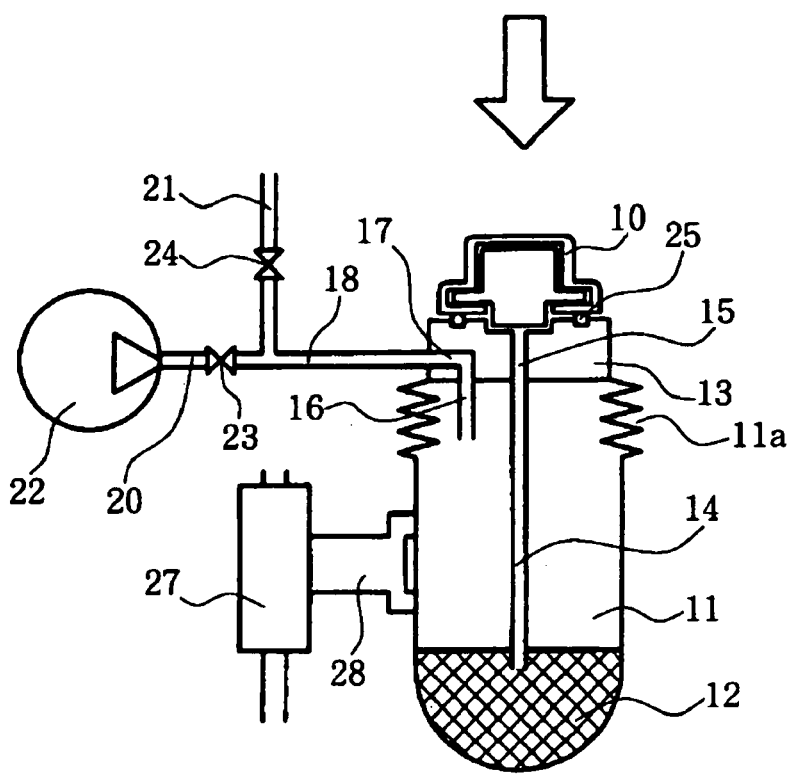
Figure 6:
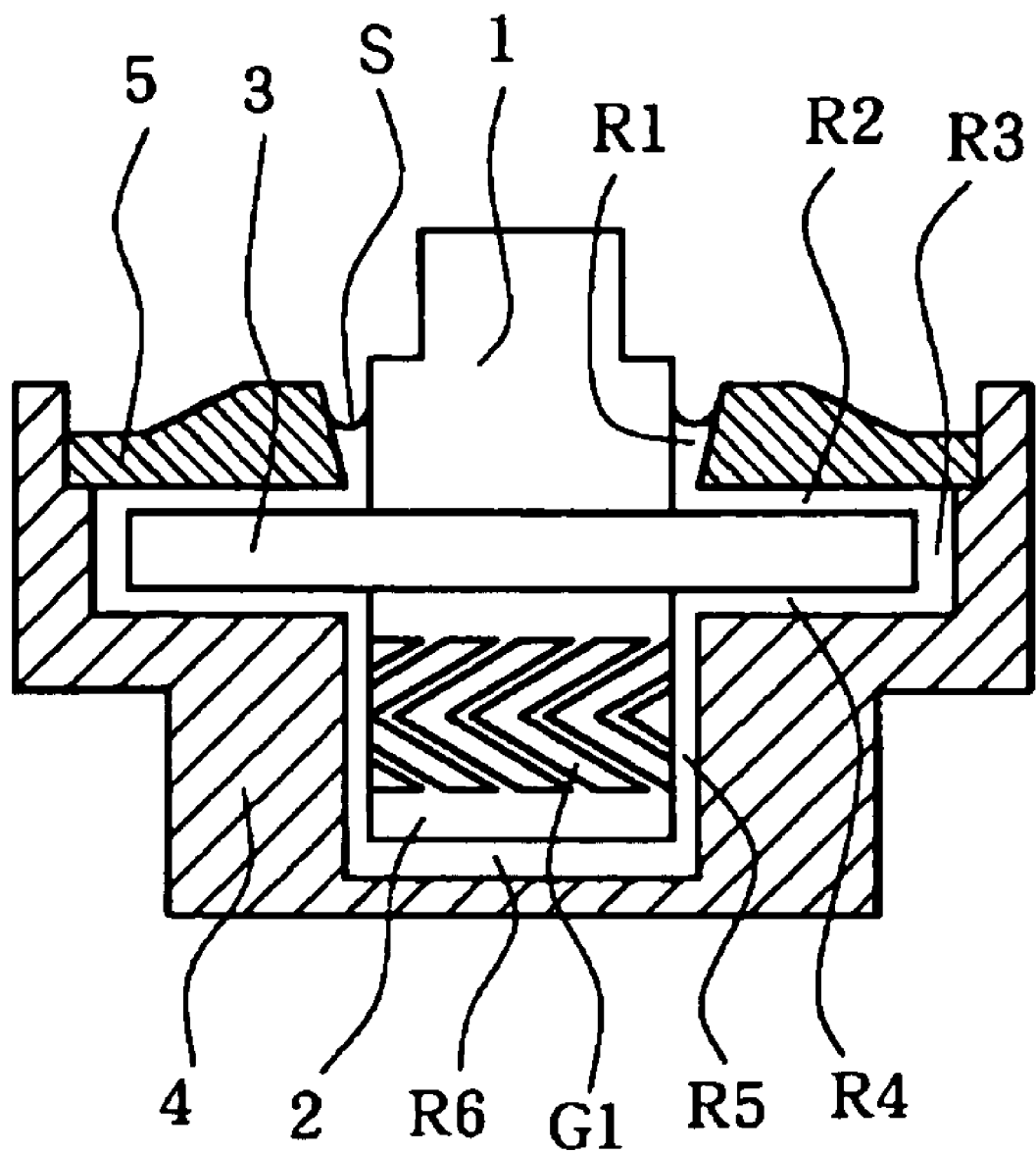
FIG. 6 is a sectional view of a one-sided-bag-shaped fluid dynamic pressure bearing, showing minute gaps in somewhat exaggerated sizes.

As shown in FIGS. 1, 2, and 4, an oil injecting apparatus according to a first embodiment of the present invention includes a bearing seating 30 having a bearing seating surface formed on its front surface and an oil injection through-passage 31 extending through the bearing seating 30 from this front surface to the back surface thereof, a cover member 32 provided with an injection tube pass-through hole 33 and a suction/exhaust through-hole 34, an oil container 11 storing an oil 12 to a predetermined level and sealed with the cover member 32, a suction/exhaust tube 18 whose one end is connected to one end of the suction/exhaust through-hole 34 of the cover member 32 and whose other end is connected to a suction/exhaust device, an injection tube 36, a distance changing device for changing the distance between the bearing seating 30 and the oil container 11, and bearing fixing means 26 for fixing airtight onto the bearing seating 30 a one-sided-bag-shaped fluid dynamic pressure bearing 10, into which oil is to be injected, with its surface on the oil injection port side being seated and abutted onto an O-ring 25.

The injection tube 36 with a flat outer peripheral surface passes through the injection tube pass-through hole 33, which has a flat inner peripheral surface, in an airtight manner and so as to be vertically movable, with the lower end of the injection tube 36 projecting into the oil container 11 and the upper end thereof being secured to the lower end of the oil injection through-passage 31 of the bearing seating 30. The airtightness between the injection tube pass-through hole 33 and the injection tube 36 is secured by an O-ring 35 arranged in the injection tube pass-through hole 33. The airtightness can be further enhanced by providing the O-ring 35 in two, three, and more stages.

The distance changing device serves to change the distance between the oil container 11 and the bearing seating 30 so as to bring the oil injecting apparatus from an exhaust position (FIG. 1) with the lower end of the injection tube 36 positioned away from the oil level into an injection position (FIG. 2) with the lower end of the injection tube 36 submerged into the oil. As shown in FIG. 4, the distance changing device includes a hydraulic pump 27 and an oil container holder 28, and raises/lowers the oil container 11 with respect to the bearing seating 30 whose position is fixed, thereby changing the distance between the oil container 11 and the bearing seating 30.

The suction/exhaust device includes a vacuum pump 22, suction/exhaust tubes 20, 21, and valves 23, 24.

Oil injection is performed as follows with the oil injecting apparatus according to the first embodiment of the present invention. First, in the exhaust position (FIG. 1) with the distal end of the injection tube 14 positioned away from the oil level in the oil container 11, a control device (not shown) opens the valve 23 and closes the valve 24, and activates the vacuum pump 22. As this happens, the inside of the oil container 11 is evacuated, and at the same time, the inside of the one-sided-bag-shaped fluid dynamic pressure bearing 10, which communicates with the inside of the oil container 11 through the injection tube 36 and the oil injection through-passage 31, is also evacuated into a vacuum.

Then, the control device drives the hydraulic pump 27 to move the oil container 11 into the injection position (FIG. 2), whereby the lower end of the injection tube 36 is submerged into the oil 12 in the oil container 11. Subsequently, the control device closes the valve 23 and opens the valve 24. As this happens, the inside of the oil container 11 is communicated with the atmosphere through the suction/exhaust through-hole 34, and the suction/exhaust tubes 18 and 21, and thus turned into the atmospheric pressure. This causes the oil 12 in the oil container 11 to be injected into the one-sided-bag-shaped fluid dynamic pressure bearing 10.

Figure 3:
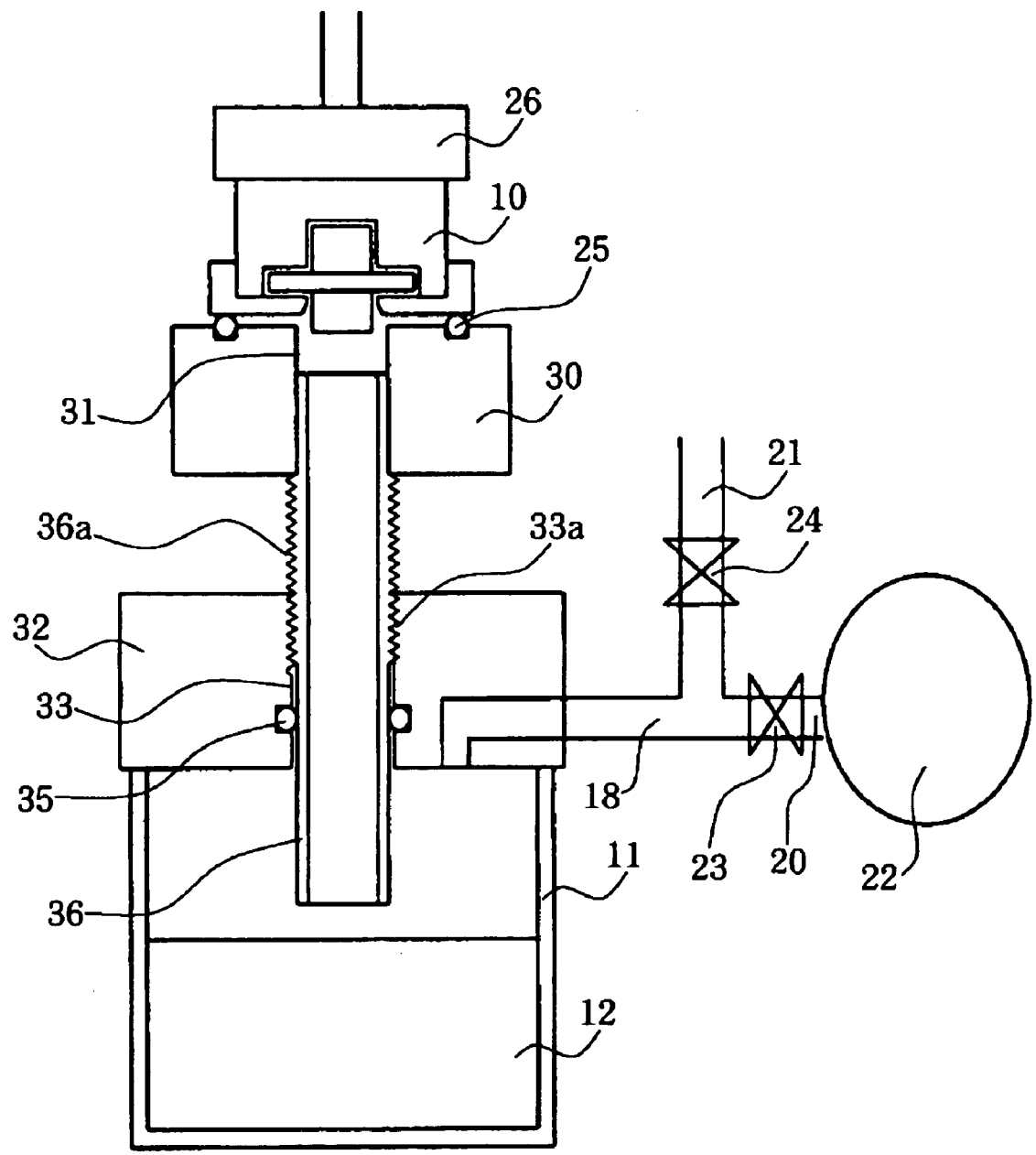
FIG. 3 is a sectional view schematically showing an oil injecting apparatus for a one-sided-bag-shaped fluid dynamic pressure bearing according to a second embodiment of the present invention in an exhaust position.

As shown in FIG. 3, an oil injection apparatus according to a second embodiment of the present invention includes a bearing seating 30 having a bearing seating surface formed on its front surface and an oil injection through-passage 31 extending through the bearing seating 30 from this front surface to the back surface thereof, a cover member 32 provided with an injection tube pass-through hole 33 and a suction/exhaust through-hole 34, an oil container 11 storing an oil 12 to a predetermined level and sealed with the cover member 32, a suction/exhaust tube 18 whose one end is connected to one end of the suction/exhaust through-hole 34 of the cover member 32 and whose other end is connected to a suction/exhaust device, an injection tube 36, a distance changing device for changing the distance between the bearing seating 30 and the oil container 11, and bearing fixing means 26 for fixing airtight onto the bearing seating 30 a one-sided-bag-shaped fluid dynamic pressure bearing 10, into which oil is to be injected, with its surface on the oil injection port side being seated and abutted onto an O-ring 25.

The injection tube 36 with a male thread 36a formed on an intermediate section thereof passes through the injection tube pass-through hole 33, which is provided with a female thread 33a that threadedly engages with the male thread 36a, in an airtight manner and so as to be vertically movable, with the lower end of the injection tube 36 projecting into the oil container 11 and the upper end thereof being secured to the lower end of the oil injection through-passage 31 of the bearing seating 30. The airtightness between the injection tube pass-through hole 33 and the injection tube 36 is secured by an O-ring 35 arranged in the injection tube pass-through hole 33.

The distance changing device serves to change the distance between the oil container 11 and the bearing seating 30 so as to bring the oil injecting apparatus from an exhaust position with the lower end of the injection tube 36 positioned away from the oil level into an injection position with the lower end of the injection tube 36 submerged into the oil. The distance changing device includes a stepping motor (not shown), and rotates and vertically moves the bearing seating 30, onto which the one-sided-bag-shaped fluid dynamic pressure bearing 10 to be injected with oil is fixed airtight, thereby changing the relative distance from the oil container 11 whose position is fixed.

The suction/exhaust device includes a vacuum pump 22, suction/exhaust tubes 20, 21, and valves 23, 24.

The oil injecting apparatus employing a vacuum injection method according to the second embodiment of the present invention is the same as the oil injecting apparatus employing a vacuum injection method according to the first embodiment described above, except for the distance changing means for changing the distance between the oil container and the bearing seating, onto which the one-sided-bad-shaped fluid dynamic pressure bearing to be injected with oil is seated and fixed airtight.

That is, in the first embodiment, as the distance changing means for effecting a change from the exhaust position to the injection position, the outer peripheral surface of the injection tube 36 and the inner peripheral surface of the injection tube pass-through hole 33 of the cover member 32 are both formed as flat surfaces, and the oil container 11 is moved without being rotated, thereby changing the relative distance of the oil container 11 from the bearing seating 30 onto which the one-sided-bag-shaped fluid dynamic pressure bearing 10 to be injected with oil is fixed airtight.

In contrast, in the second embodiment, as the distance changing means for effecting a change from the exhaust position to the injection position, the male thread is formed on a part of the outer peripheral surface of the injection tube 36 and brought into threaded engagement with the female thread formed on a part of the inner peripheral surface of the injection tube pass-through hole 33 of the cover member 32, and the bearing seating 30, onto which the one-sided-bag-shaped fluid dynamic pressure bearing 10 to be injected with oil is fixed airtight, is rotated for vertical movement, thereby changing the relative distance of the bearing seating 30 from the oil container 11 whose position is fixed.

INDUSTRIAL APPLICABILITY

According to the present invention, in the oil injecting apparatus for injecting oil into a one-sided-bag-shaped fluid dynamic pressure bearing by a vacuum injection method, the injection tube is disposed so as to be movable while passing through the oil container cover, with airtightness being retained by the O-ring, and the distance between the oil container and the bearing seating, onto which the one-sided-bag-shaped fluid dynamic pressure bearing to be injected with oil is fixed airtight, is changed to thereby effect a change from the exhaust position to the injection position.

Therefore, as compared with conventional oil injecting apparatuses equipped with an extendable part such as a bellows, the present invention can provide an oil injecting apparatus for a one-sided-bag-shaped fluid dynamic pressure bearing which provides good operability and low maintenance cost.

The invention claimed is:

1. An oil injecting apparatus comprising:
    a bearing seating having a bearing seating surface formed on a front surface thereof and an oil injection through-passage extending through the bearing seating from the front surface to a back surface thereof:
    a cover member having an injection tube pass-through hole and a suction/exhaust through-passage;
    an oil container storing oil to a predetermined level and sealed with the cover member;
    a suction/exhaust tube having one end connected to the suction/exhaust through-passage and the other end connected to a suction/exhaust device;
    an injection tube passing through the injection tube pass-through hole of the cover member such that the injection tube is capable of vertical movement while maintaining airtightness, the injection tube having a lower end projecting into the oil container and an upper end secured to a lower end of the oil injection through-passage passage of the bearing seating;
    a distance changing device which changes a distance between the bearing seating and the oil container from an exhaust position in which the lower end of the injection tube is positioned away from an oil level to an injection position in which the lower end of the injection tube is submerged into oil; and
    bearing fixing means abutting a one-sided-bag-shaped fluid dynamic pressure bearing into which oil is to be injected, for fixing airtight the one-sided-bag-shaped fluid dynamic pressure bearing onto the bearing seating;
    wherein the one-sided-bag-shaped fluid dynamic pressure bearing is fixed onto the cover member by the bearing fixing means, an inside of the one-sided-bag-shaped fluid dynamic pressure bearing is brought into a vacuum in the exhaust position by the suction/exhaust device, and then in the injection position, the suction/exhaust tube is released to an atmosphere to inject oil in the oil container into the one-sided-bag-shaped fluid dynamic pressure bearing.

2. An oil injecting apparatus according to claim 1; wherein the distance changing device vertically moves the bearing seating.

3. An oil injecting apparatus according to claim 1; wherein the distance changing device vertically moves the oil container (11).

4. An oil injecting apparatus according to claim 3; wherein the distance changing device includes a stepping motor.

5. An oil injecting apparatus according to claim 2; wherein the distance changing device includes a stepping motor.

6. An oil injecting apparatus according to claim 1; wherein the distance changing device includes a stepping motor.

7. An oil injecting apparatus according to claim 3; wherein the distance changing device includes a hydraulic motor.

8. An oil injecting apparatus according to claim 2; wherein the distance changing device includes a hydraulic motor.

9. An oil injecting apparatus according to claim 1; wherein the distance changing device includes a hydraulic motor.

* * * * *